United States Patent [19]

Hoerner

[11] 4,182,468
[45] Jan. 8, 1980

[54] COMBINED CLOSURE AND RUMBLE SEAT FOR AUTOMOBILES

[76] Inventor: Griffith L. Hoerner, 2211 Montana Ave., Santa Monica, Calif. 90403

[21] Appl. No.: 844,367

[22] Filed: Oct. 21, 1977

[51] Int. Cl.² ............................................. B60R 7/00
[52] U.S. Cl. ...................................224/311; 224/309; 296/99 A
[58] Field of Search ............................ 296/146, 99 A; 224/42.03 B, 29 K, 29 L, 42.43

[56] References Cited

U.S. PATENT DOCUMENTS

| 2,973,221 | 2/1961 | Blackman | 296/146 |
| 3,385,629 | 5/1968 | Podolan | 296/146 |
| 4,085,874 | 4/1978 | Graber | 224/42.03 B |

FOREIGN PATENT DOCUMENTS 347711  4/1931  United Kingdom ..................... 296/99

Primary Examiner—Richard A. Bertsch
Attorney, Agent, or Firm—Jay H. Quartz

[57] ABSTRACT

An opening formed in an automobile deck is closeable by a closure pivotedly mounted on the deck for forwardly pivotal movement into a closed position and for rearwardly pivotal movement into an open position in which it forms a seat back for a rumble seat which also includes a collapsible seat section which is hung from the closure or from the deck. Means are provided to fold the seat section against the undersurface of the closure when the latter is closed or open and to limit rearward pivotal movement of the closure. Additionally, means are provided to enable the closure, when in its open position, to be used as a bicycle rack.

The described rumble seat structure may be utilized in combination with an existing trunk lid or a deck not incorporating a trunk lid.

9 Claims, 7 Drawing Figures

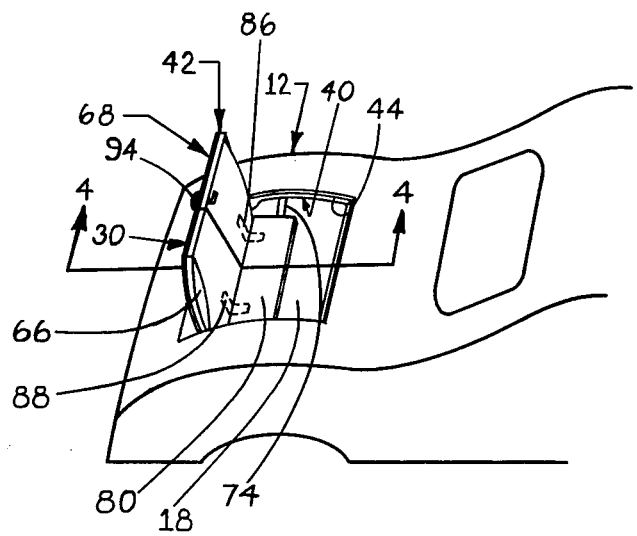
FIG. 2
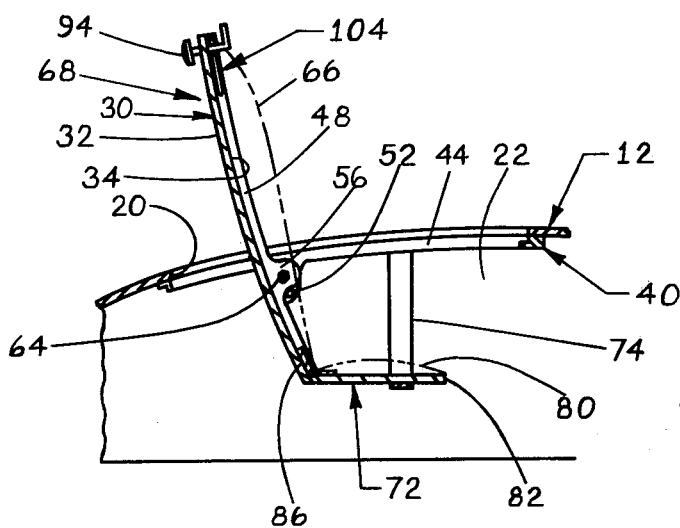
FIG. 4
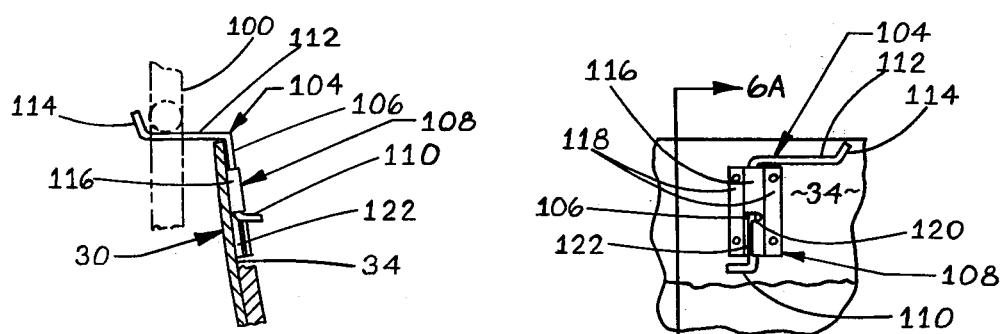
FIG. 6A
FIG. 6

COMBINED CLOSURE AND RUMBLE SEAT FOR AUTOMOBILES

BACKGROUND OF THE INVENTION

This invention relates to vehicle deck closures and, more particularly, it relates to such closures which open to form rumble seats.

In order to increase passenger carrying capacity, early automobiles were constructed with rumble seats as shown, for example, in U.S. Pat. No. 1,654,878. Because of their popularity, rumble seats engendered many and varied designs as exemplified by the following U.S. Pat. Nos. 1,806,692; 1,816,937; 1,895,832; and 2,880,033. However, although passenger carrying capacity was increased by the rumble seat, it was usually accomplished at the expense of trunk storage capacity because of the substantial volume occupied by the rumble seat cushions. This problem was recognized in U.S. Pat. No. 1,796,081, issued Mar. 10, 1931 to E. A. Bundy and entitled "Combination Rumble Seat and Back For Vehicles," but the solution proposed therein (pivoting the seat cushion forwardly within the trunk cavity), although increasing the utility of the trunk, nevertheless still retained the familiar rumble seat cushion and thus did not provide a completely satisfactory solution to the problem of how to increase trunk carrying capacity.

In U.S. Pat. No. 1,806,692, issued May 26, 1931 to G. A. Lemon and entitled "Rumble Seat Construction," a rumble seat is described in which the seat is positioned immediately under the trunk lid (and trunk closure or rumble seat back which forms a part of the lid). This construction permits substantially full use of the trunk for storage when the trunk lid is raised. However, because the seat is fixed in position, it essentially prevents loading of the trunk through the opening closed by the trunk back.

In U.S. Pat. No. 2,880,033, issued Mar. 31, 1959 to A. L. Shelton and also entitled "Rumble Seat Construction," another arrangement is described in which the seat section folds up against the seat back when the rumble seat is closed to maximize trunk storage capacity. However, like the Lemon rumble seat construction, the seat of the Shelton rumble seat is moved into a seating position when the trunk back is opened thereby providing an obstacle to insertion of packages through the rumble seat opening. Additionally, the rumble seat mechanism described by Shelton is quite complex.

As will be understood from the foregoing, there remains a need for a rumble seat comprising a seat section which is foldable against the seat back when the latter is in both its open and closed positions to maximize trunk storage capacity and to permit package insertion through the opening closed by the seat back.

In order to carry bicycles on a vehicle, a bike rack has to be mounted thereon. Unfortunately, many bike racks restrict use of a vehicle's trunk, particularly when bicycles are carried thereon. It would, therefore, be advantageous to be able to carry bicycles on a vehicle and still have unrestricted access to that vehicle's trunk.

SUMMARY OF THE INVENTION

This invention is embodied in an automobile rumble set comprising a deck closure which is openable to form the rumble seat in combination with a collapsible seat hung from the deck or deck closure within a trunk cavity. Means are provided to secure the seat in a collapsed or folded position against the undersurface of the closure when the latter is closed or open and to limit pivotal travel of the closure. Additional means are provided to permit releaseable suspension of the seat so that it can be completely removed from a trunk cavity if desired.

The described invention solves the problem of rumble seat volume as it relates to trunk storage or carrying capacity. This is accomplished by suspending the seat within the trunk cavity using supports which permit collapse of the seat into an essentially flat mode against the seat back when in its open or closed positions to thereby minimize the volume occupied by the seat when it is desired to use the trunk for storage and to thereby permit trunk loading through the rumble seat opening if desired. The collapsible feature of the seat is provided without sacrificing the passenger-carrying capacity of the seat.

As an optional feature, the deck closure can be utilized as an upper suspension point to aid in carrying one or more bicycles at the rear of an automobile. The hardware for supporting bicycles on the deck closure may be received by the latter when not in use so that the hardware is hidden in the deck closure thereby permitting unobstructed closure of a rumble seat.

The described invention can be utilized on vehicles which are provided with deck lids as well as on vehicles e.g., some sports cars, in which access to the trunk is from within the passenger compartment of the vehicle. It can also be utilized in combination with the roofs or decking of station wagons.

This invention is particularly suitable for converting vehicles without rumble seats to vehicles with rumble seats.

DESCRIPTION OF THE DRAWINGS

FIG. 2 is a perspective view similar to that of FIG. 1 except that in FIG. 2, the described rumble seat is shown in its open position.

FIG. 4 is a partial sectional elevational view of the rear deck of FIG. 1 taken along the line 4—4 of FIG. 2.

FIG. 6 is a partial sectional view of the undersurface of a rumble seat back in open position showing bicycle-supporting means attached thereto in stowed position.

FIG. 6a is a side elevational view taken along the line 6a—6a of FIG. 6, but showing the bicycle-supporting means in bicycle-supporting position.

DESCRIPTION OF THE PREFERRED EMBODIMENT

Figure 1:
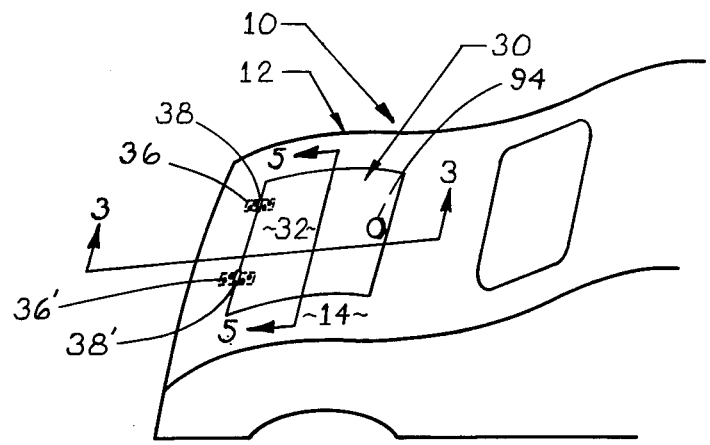
FIG. 1 is a perspective view of a rear deck of an automobile incorporating the herein-described rumble seat and showing the latter in closed position.

In general, a closure is mounted on a vehicle deck for forward, pivotal movement about a rearward axis to close an opening in the deck and for limited rearward pivotal movement into an essentially upright position to form the back support section of a rumble seat. A collapsible seat is suspended below the deck opening to function as the seat section of the rumble seat. Means are provided to limit the rearward pivotal travel of the closure and to retain the seat in a collapsed or folded position when not in use as well as to permit removal of the seat from a trunk. Additional means are provided to support bicycles on the deck closure when the latter is in its open position.

The invention, having been described in general terms, will now be described with more particularity with reference to the drawings and initially to FIGS. 1-4 in which the numeral 10 designates an automobile having a rear deck 12 which forms part of the automobile's trunk structure and which has an outer or upper surface 14 and an inner or undersurface 16. An opening 18 defined in part by a rearward deck edge face 20 is formed in the deck 12 to provide entry from the exterior of the deck 12 into a trunk or trunk cavity 22 defined in part by the deck.

A closure 30 for the opening 18 is carried by the deck 12 for limited forward/rearward pivotal movement about a transverse axis at or adjacent to the opening-defining rear edge face 20. The closure 30 is shaped to generally conform to that of the deck opening 18, but is slightly smaller in area than the opening to permit closure thereof. Additionally, the closure 30 has an outer and an inner surface 32, 34, respectively, with the former surface generally conforming in curvature with that of the deck outer surface 14.

Pivotal movement of the closure 30 may be provided for in a number of ways. For example, as shown in phantom line in FIG. 1, a pair of hinges 36, 36' may each be conventionally mounted on adjacent portions of the outer surfaces 32, 14 (or equivalent inner surfaces) of the closure 30 and deck 12, respectively, to interconnect those surfaces to provide pivotal movement of the closure about a transverse axis extending through transversely-disposed hinge pins 38, 38'.

Alternatively and preferably, the closure 30 is mounted or carried on the deck 12 by pivotally interconnecting reinforcing structural frame units depending from undersurfaces of both the closure and deck in juxtaposed relation such as is disclosed in U.S. Pat. No. 1,933,623, issued Nov. 7, 1933 and entitled "Convertible Vehicle Body" as will now be described.

Figure 5:
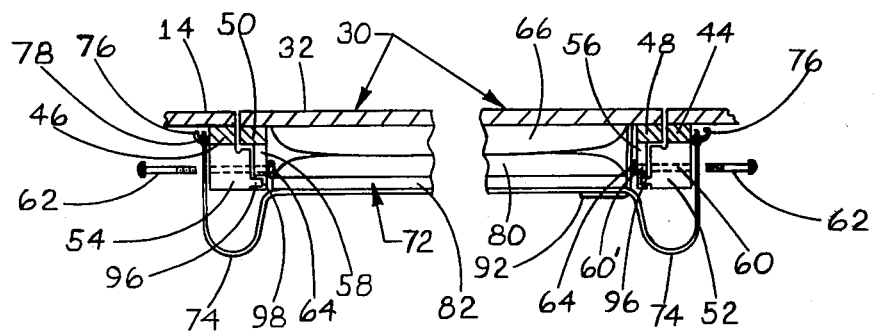
FIG. 5 is a partial sectional view taken along the line 5—5 of FIG. 1 showing means for pivotally supporting the deck closure.

Referring particularly to FIG. 5 which shows a portion of the deck 12 surrounding the opening 18, the numeral 40 designates a depending deck frame which extends around the periphery of the opening. Use may be made of existing reinforcing frames or flanges in applications where a trunk lid is utilized as, or converted to, a rumble seat back. The trunk opening normally closed thereby then serves also as the rumble seat opening as shown, for example, in U.S. Pat. No. 1,806,692. In applications where a closure is cut out of a rear deck, reinforcing frames may be made to depend from the deck about the resulting opening therein. Such frames can be made from metal and attached to the deck by appropriate fasteners or they can be made from a glass-fiber reinforced polyester resin composition attached to the undersurface of a deck by utilizing fasteners such as screws or by using a bonding agent such as an epoxy resin. As is well known, the deck reinforcing frame 40 is adapted to mate with a similar reinforcing frame 42 depending from and extending along the periphery of the closure 30 to seal against the entry of water into the trunk cavity 22 when the closure is closued, to permit the required pivotal movement of the closure with respect to the deck 12, and to limit closing movement of the closure.

Structurally, the deck frame 40 reinforces the deck 12 and comprises, inter alia, side flanges 44, 46. Similarly, the closure reinforcing frame 42 which depends from the undersurface 34 of the closure 30 comprises, inter alia, side flanges 48, 50 in juxtaposition with the corresponding deck flanges 44, 46 respectively, when the closure 30 is closed.

In order to pivotally suspend the closure 30 from the deck 12, it is preferable to form the deck and closure side flanges 44, 46 and 48, 50, respectively, with enlarged flaps or ears 52, 54 and 56, 58, respectively. Each ear has an aperture 60 formed therein and extending therethrough in alignment with each other aperture so that the apertures e.g., 60 and 60', of confronting ears, e.g., 52 and 56, are aligned with each other to receive an end-threaded pivot pin 62 extending therethrough and locked against removal at its threaded end by a nut 64.

The undersurface 34 of the closure 30 may be provided with suitable padding, e.g., a cushion 66 adhesively attached thereto to form, in combination with the closure, a seat back 68 of a rumble seat.

To complete the rumble seat, a seat section is hung within the trunk cavity 22 from the deck 12 or from the closure 30. The seat section comprises a seat 72 suspended below the closure 30 by collapsible suspension means preferably in the form of one or more foldable straps 74, each of which is attached at its ends to opposing deck frame side sections 44, 46 so that each strap extends transversely below the deck opening 18 to support the seat 72 thereunder. Releaseable attachment of each strap 74 to the deck frame 40 may be made by, for example, extending hooks 76 imbedded in the deck frame side sections 44, 46 through eyelets 78 inserted in each strap. The latter 74 may be made from nylon webbing.

The seat 72 comprises a seat pad 80 adhered to a rigid platform 82 which, in turn, may be adhesively attached to the supporting strap 74. Wood, metal or plastic may be used to form the platform.

Alternatively or additionally, the seat 72 may be hingedly attached along its rearward edge to the undersurface 34 of the closure 30 with straps such as those designated by the numeral 74 with the latter being attached at forward positions of the seat. More particularly, as shown in FIGS. 2 and 4, each of a pair of hinges 86, 88 is attached both to the seat platform 82 along a rear edge thereof and to the closure undersurface 34 to permit pivotal movement of the forward edge of the seat 72 toward and away from that undersurface. To provide support for the forward edge of the seat 72 and to limit pivotal movement of the latter, the strap 74 is attached at its ends to the deck side flanges 44, 46 (or, alternatively, to the closure side flanges 48, 50) and at an intermediate position to a point under the seat platform 82 adjacent its forward edge.

Figure 3:
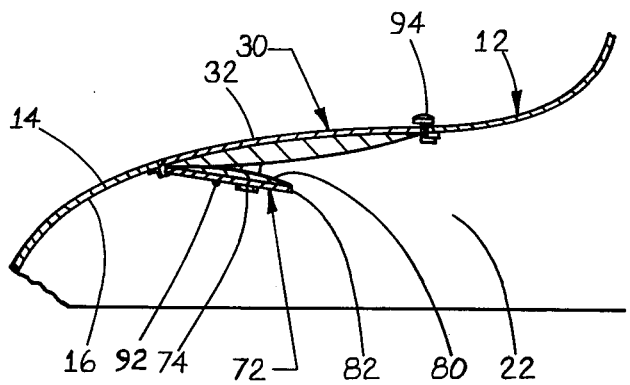
FIG. 3 is a partial sectional side elevational view of the rear deck of FIG. 1 taken along the line 3—3 of the latter.

To maximize the cargo-carrying capacity of the trunk 22 when the rumble seat is not in use, the seat 72 is simply raised or folded against the back cushion 66 (as shown in FIG. 3) and held in that position by retention means comprising, e.g., a rotatable L-shaped post 92 having one end section secured in the closure undersurface 34, but permitting rotational movement thereof about its axis, and having its other end section extending at right angles from the first end section to overlie the seat 72 when the latter is folded against the back cushion 66 to retain the seat between the back cushion and the angled section of the post (see FIG. 5).

Conventional locking means 94 may be mounted adjacent to the forward edge of the closure 30 for locking engagement with the adjacent portion of the deck 12 when the opening 18 is closed by the closure.

In operation, with the closure 30 initially in its closed position as shown in FIGS. 1 and 3, opening is initiated by pulling upwards on the locking means 94 at the forward end of the closure 30. This causes the closure 30 to pivot about a transverse axis extending through the pivot pins 62, 62 connecting the closure to the rear deck 12. As the forward end of the closure 30 rotates upwardly away from the deck 12, the rear area of the closure behind the transverse axis rotates downwardly into the trunk cavity 22. As previously noted, adjacent rear faces of the closure 30 and deck are shaped relative to each other to permit such downward (and somewhat rearward) movement of the rear end of the closure to occur without obstruction. Rotational movement of the closure 30 continues until it encounters a stop, for example, in the form of the trunk floor (as shown in FIG. 2 of U.S. Pat. No. 1,806,692, issued May 26, 1931 and entitled "Rumble Seat Construction"). An alternative form of stop includes a horizontally-disposed pin(s) 96 extending inwardly from a deck flange ear 52 (and/or 54) and adapted to engage a shoulder 98 formed in the adjacent closure flange ear 56 and/or 58 as shown in FIG. 5 when the closure 30 reaches its fully open position.

In its essentially upright or open position as shown in FIGS. 2 and 4, the closure 30 provides the support for the rumble seat back 68. To add a seat, the L-shaped pin 92 is disengaged from the seat 72 by rotating it ninety degrees whereby the seat can be lowered from its stored position against the rumble seat back for seating use. With the closure 30 in upright position, the seat 72 may be removed completely from the trunk cavity 22 to permit unrestricted access to the latter through the opening 18 in the deck 12.

While in its upright position, the closure 30 may be used to support bicycles 100 (shown representationally in phantom line in FIG. 6a) in transverse position at the rear of the vehicle 10. Such suspension may be accomplished in various ways. For example, a pair of handles (not shown) may be attached, as by screws, to the undersurface 34 of the closure 30 in a manner such that there is access to them with the cushion 66 in position against that undersurface. Straps (not shown) can be looped through the handles and around the bicycle frames to securely suspend the bicycles 100 against the outer surface 32 of the closure. Alternatively or additionally, in order to suspend bicycles away from the closure, bicycle-support means mounted on the underside of the closure and comprising telescoping bicycle-supporting members and brackets may be utilized. Briefly, such means is extendable over the upper edge of the closure 30 (when upright) to support bicycles, but is retractable from the extended position to permit closing of the closure.

Referring to FIGS. 6 and 6a, each bicycle-supporting member 104 which may be formed from metal comprises an intermediate leg section 106 which telescopes into a bracket 108 fastened to the closure undersurface 34 and generally vertically disposed when the closure 30 is in its open position. The intermediate leg 106 terminates at its lower end in a foot section 110 projecting forwardly therefrom and terminates at its upper end in a rearwardly-extending bicycle-supporting arm 112 forming a vertical stop 114 at its outer end. The bicycle-supporting arm 112 is preferably co-planar with, but extends directionally opposite to, the foot section 110.

Each bracket 108 comprises a hemi-cylindrical housing 116 having radially-extending side flanges 118 and defining an elongated bore 120 extending therethrough and having formed therein an L-shaped slot 122 extending longitudinally along one side from one end thereof adjacent a flange and then transversely thereof to terminate along the longitudinal axis of the housing intermediate the edge thereof to provide communication between the bore and exterior of the housing.

When in use, the bicycle-supporting arm 112 of each member 104 extends rearwardly over the forward (or then upper) edge of the closure 30 for suspending bicycles therefrom. Each leg section 106 extends downwardly generally along the undersurface 34 of the closure 30 and telescopes into the bracket housing 116 with the foot section 110 of the member 104 projecting outwardly from the bore 120 through the closed end of the transverse section of the slot 122 and extending away from the closure undersurface 34. By making the foot section 110 longer than the diameter of the bore 120, the foot section functions to prevent the member 104 from being pulled upwardly out of the bore. As previously described, the various sections of the member 104 lie in the same plane. Therefore, to return the member 104 to its rest position after use, it is turned ninety degrees so that its plane roughly parallels that of the undersurface 34 of the closure 30. In this position, the leg section 106 can be lowered through the bore 120 because the foot section 110 will have been rotated ninety degrees out of the transverse section of the slot 122 into the longitudinal section thereof. Lowering of the leg section 106 continues until the arm 112 contacts the upper end of the bracket 108 at which point the foot section will have exited from the open end of the slot 122. The bicycle-supporting member 104 is then recessed so that the closure 30 can be closed without obstruction.

Before the closure 30 is closed, the seat 72 is folded against the seat back 68 and retained in that stowed position by rotating the L-shaped post 92 ninety degrees. The closure 30 is then rotated into its closed position. Alternatively, if only straps 74 are used to support the seat 72, the latter may be completely removed from the trunk 22 to fully maximize the trunk storage capacity by slipping the strap eyelet 78 over their retaining hooks 76.

The invention has been described with reference to an opening in an otherwise continuous deck having no deck opening as well as with respect to a deck having a conventional trunk lid in which case the entire trunk lid becomes the rumble seat back. However, the invention can be as readily utilized in combination with an opening in a conventional trunk lid. In the latter case, the described deck flange would be disposed under the trunk lid about an opening formed therein and any described deck attachment points would become trunk lid attachment points. References in the claims to decks will be understood to encompass trunk lids in such cases. The described invention may also be used in conjunction with both a forwardly and a rearwardly opening trunk lid as shown in U.S. Pat. No. 1,774,199 issued Aug. 26, 1930 and entitled "Tonneau Construction."

I claim:

1. In combination with a vehicle deck having an opening formed therein to provide access to a storage cavity interiorly thereof and having a closure rotatably mounted thereon for pivotal movement into a generally upright position to form a back support section of a rumble seat and into a closed position over said opening, the improvement which comprises:

a seat;

flexible strap means attached to said deck or to said closure and to said seat for suspending said seat within said cavity to act in combination with said closure to form said rumble seat and for permitting storage of said seat against said back support section both when said closure is in said upright and closed positions; and retention means carried on said closure for releaseably holding said seat against said back support section.

2. The improvement of claim 1 wherein said strap means is releaseably attached to said deck or to said closure to permit removal of said seat from said cavity.

3. The improvement of claim 1 which further includes:

hinge means interconnecting said seat and said closure for pivotal movement of a forward edge of said seat toward said closure to fold said seat against said back support section for storage and away from said closure for seating.

4. The improvement of claim 1 which further includes:

bicycle-support means carried on the underside of said closure for carrying bicycles thereon when said closure is in said upright position.

5. The improvement of claim 4 wherein said bicycle-support means is extendable over an upper edge of said closure when in said upright position and is retractable from its extended position to permit unrestricted closing of said opening by said closure.

6. The improvement of claim 4 wherein said bicycle-support means comprises:

at least one bracket mounted on said underside of said closure and defining a bore; and a bicycle-supporting member carried by said bracket, said member having a first end section retractable into said bore and having a second end section extendable over an upper edge of said closure for supporting bicycles thereon when said first end section is partially withdrawn from said bore, said second end section being disposed along said underside of said closure to permit unrestricted closing thereof when said first end section is retracted into said bore.

7. In combination with a vehicle rumble seat which comprises as a seat back, a closure pivotally mounted on the deck of the vehicle for closing an opening formed therein, the improvement which comprises:

bicycle support means carried on the underside of said closure for supporting bicycles from said closure when in its open position.

8. The improvement of claim 7 wherein said bicycle support means is extendable over an upper edge of said closure when in said open position and is retractable from its extended position to permit unrestricted closing of said closure.

9. The improvement of claim 7 wherein said bicycle support means comprises:

at least one bracket mounted on said underside of said closure and defining a bore; and a bicycle-supporting member carried by said bracket, said member having a first end section retractable into said bore and having a second end section extendable over an upper edge of said closure for supporting bicycles thereon when said first end section is partially withdrawn from said bore, said second end section being disposed along said underside of said closure to permit unrestricted closing thereof when said first end section is retracted into said bore.

* * * * *

Disclaimer 4,182,468.—*Griffith L. Hoerner*, Santa Monica, Calif., COMBINED CLOSURE AND RUMBLE SEAT FOR AUTOMOBILES. Patent dated Jan. 8, 1980. Disclaimer filed June 29, 1981, by the inventor.

Hereby enters this disclaimer to claims 4-9 inclusive of said patent

[*Official Gazette Sept. 15, 1981.*]